(12) United States Patent
Olivreau et al.

(10) Patent No.: US 12,247,661 B2
(45) Date of Patent: Mar. 11, 2025

(54) FLAT GASKET

(71) Applicant: CARL FREUDENBERG KG, Weinheim (DE)

(72) Inventors: Stéphane Olivreau, Blond (FR); Claire Rouchette, Limoges (FR); Hervé Di Meo, Saint Cyr (FR)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 17/697,090

(22) Filed: Mar. 17, 2022

(65) Prior Publication Data

US 2022/0299112 A1    Sep. 22, 2022

(30) Foreign Application Priority Data

Mar. 18, 2021   (DE) .......................... 102021106 636.0

(51) Int. Cl.
*F16J 15/08* (2006.01)

(52) U.S. Cl.
CPC ................................. *F16J 15/0818* (2013.01)

(58) Field of Classification Search
CPC .................... F16J 2015/0856; F16J 15/0818
See application file for complete search history.

(56) References Cited

U.S. PATENT DOCUMENTS

| | | | |
|---|---|---|---|
| 1,986,465 A | 1/1935 | Dempsey | |
| 3,029,480 A * | 4/1962 | Signorelli | B64C 1/14 277/921 |
| 3,355,181 A * | 11/1967 | Olson | F16J 15/127 277/611 |
| 4,026,565 A * | 5/1977 | Jelinek | F16L 23/22 285/368 |
| 4,293,135 A * | 10/1981 | Wallace | F16J 15/121 277/630 |
| 4,380,856 A * | 4/1983 | Wallace | B23P 15/00 29/412 |
| 5,149,109 A * | 9/1992 | Jelinek | F16J 15/127 403/381 |
| 5,618,047 A * | 4/1997 | Belter | F16J 15/067 277/650 |
| 6,460,859 B1* | 10/2002 | Hammi | F16J 15/127 277/649 |
| 6,553,664 B1* | 4/2003 | Schenk | F16J 15/067 29/888.3 |
| 7,063,327 B2* | 6/2006 | Salameh | F16J 15/064 277/609 |
| 8,359,742 B2* | 1/2013 | Nakamura | F16J 15/122 29/888.3 |
| 9,841,223 B2* | 12/2017 | Gu | F25D 23/028 |

(Continued)

FOREIGN PATENT DOCUMENTS

| | | |
|---|---|---|
| DE | 8716939 | 2/1988 |
| DE | 19739196 | 12/1999 |

(Continued)

*Primary Examiner* — Eugene G Byrd
(74) *Attorney, Agent, or Firm* — Sheridan Ross P.C.

(57) ABSTRACT

A flat gasket, comprising a support body, wherein the support body has at least two segments which are fixed to one another in a positive-locking manner, wherein the segments each have two main sides, wherein a sealing contour is arranged on at least one main side of each segment.

13 Claims, 2 Drawing Sheets

(56) References Cited

U.S. PATENT DOCUMENTS

Figure 1:
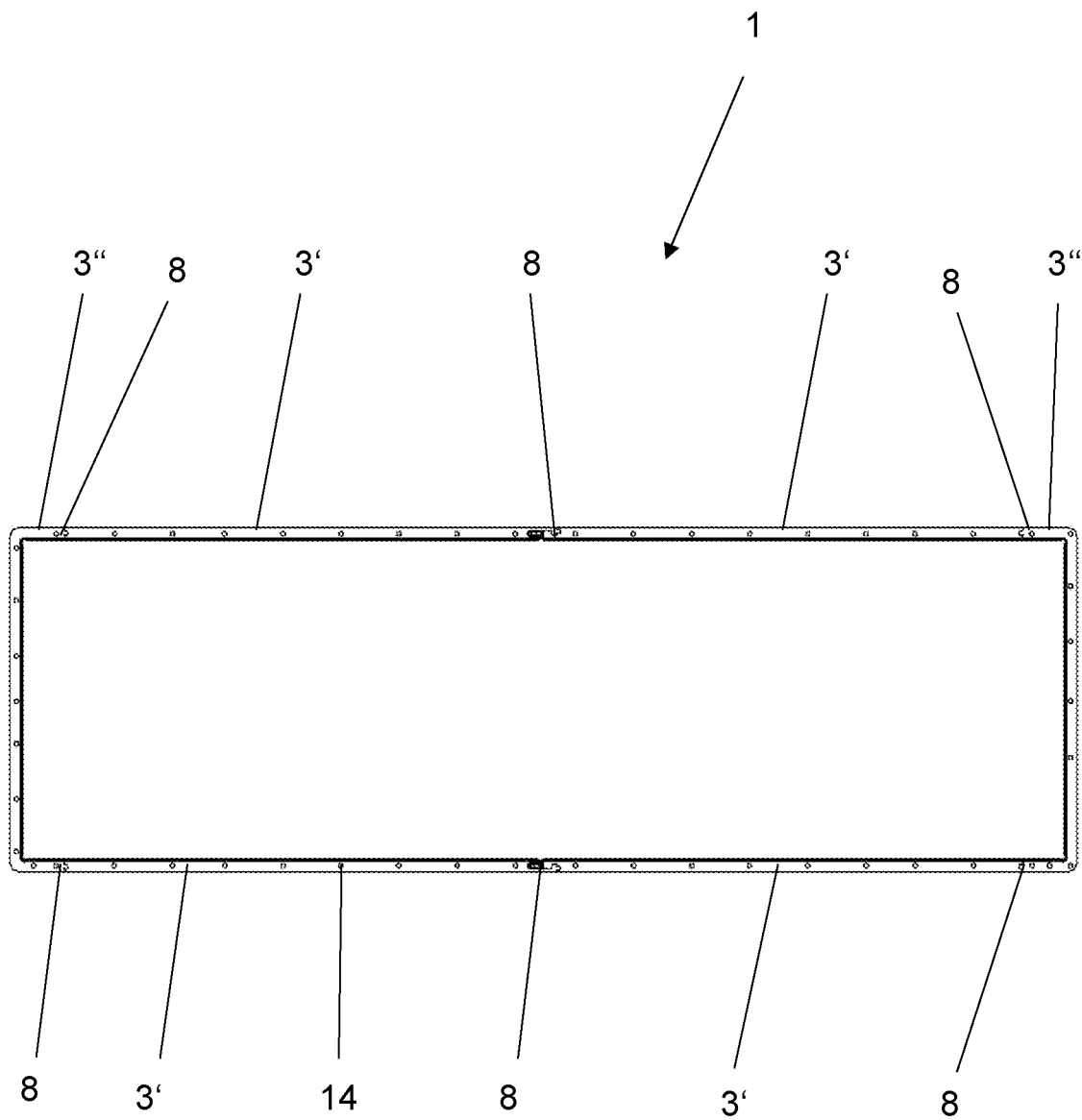

| | | | |
|---|---|---|---|
| 2011/0031704 A1* | 2/2011 | Lehr | F16J 15/061 |
| | | | 277/630 |
| 2020/0340584 A1* | 10/2020 | Pham | F16J 15/104 |
| 2022/0333688 A1* | 10/2022 | Gruhler | F16J 15/0818 |

FOREIGN PATENT DOCUMENTS

| | | |
|---|---|---|
| DE | 102019213614 | 3/2021 |
| EP | 0030843 | 6/1981 |

* cited by examiner

FLAT GASKET

CROSS-REFERENCE TO RELATED APPLICATION

This application claims the benefit of German Patent Application No. 102021106636.0 filed Mar. 18, 2021, the entire contents of which are incorporated herein by reference in its entirety.

The invention relates to a flat gasket comprising a support body, wherein the support body has at least two segments which are fixed to one another in a positive-locking manner, wherein the segments each have two main sides.

A support body for a flat gasket having several segments that are fixed to each other in a positive-locking manner is known from DE 197 39 196 C2. Support bodies of such flat gaskets are usually made of tough, metallic material. The field of application of such flat gaskets are larger machines and systems. In these, the flat gaskets have dimensions of several meters. On the one hand, there is the problem that such large-dimensioned components are difficult to manufacture; for example, it is difficult to manufacture large-dimensioned metallic support bodies by means of punching. For this reason, it is already known from the prior art to form support bodies in several parts and to connect the segments to one another in a positive-locking manner to produce the support body. The support body known from the prior art is then overmoulded with elastomeric sealing material to produce the flat gasket, resulting in a one-piece flat gasket. The problem here is that the injection moulding systems required for this would have to be very large, and at the same time only a relatively small amount of sealing material is required per flat gasket, so that such flat gaskets are very difficult to produce overall.

The invention is based on the task of providing a flat gasket for large-scale technical systems which can be produced in an inexpensive and simple manner.

This object is achieved using the features of claim 1. The subclaims refer to advantageous embodiments.

The flat gasket according to the invention comprises a support body, wherein the support body has at least two segments which are fixed to one another in a positive-locking manner, wherein the segments each have two main sides, wherein a sealing contour is arranged on at least one main side of each segment.

According to the invention, the sealing contours of each segment are formed separately from each other. In this respect, the flat gasket comprises a plurality of segments with a plurality of sealing contours defined at each segment. In this embodiment, the segments are manufactured together with the sealing contour and then the flat gasket is assembled from the segments, whereby the assembly of the flat gasket can only take place before the installation of the flat gasket. Here, it is advantageous that the size of the segments is significantly smaller than the overall size of the flat gasket, which greatly simplifies production. In particular, it is not necessary to provide a particularly large-area component with a sealing contour. The size of the segments can be adjusted to an optimal injection moulding process, so that the application of the elastomeric sealing contour is particularly cost-effective and easy. Furthermore, the transport volume is reduced, as the segments of a flat gasket can be transported in a space-saving manner.

The flat gasket can be rectangular in shape. Alternatively, the flat gasket can also be circular in shape. Generally, the shape of the flat gasket depends on the shape of the housing in which the flat gasket is installed. The flat gasket according to the invention can have an extension of several meters. Because the segments are positively fixed to each other, the segments are arranged against each other in a captive way, and the flat gasket according to the invention can be installed without any problems. Once installation is complete, the flat gasket is located between two adjacent components, with the two adjacent components pressed together to hold the flat gasket firmly in place.

First segments can be rod-shaped. Rod-shaped in the sense of the invention means that the segments are formed in a straight line. To form a flat gasket, as many first segments can be arranged one behind the other as are required to achieve the desired length of the flat gasket.

Second segments may be angled. For example, second segments can be provided with a 90-degree angle. Such segments can form corner areas of the flat gasket. Furthermore, it is conceivable that second segments form two 90-degree angles. In this embodiment, second segments form the narrow sides of a flat gasket.

The segments at the adjacent edges may be provided with positive-locking elements. In this case, the adjacent positive-locking elements are formed congruently with one another at the adjacent edges.

The sealing contours can be made of elastomeric material and can be materially bonded to the segments. Preferably, the segments are made of a tough material, such as a metallic material. The sealing contour in turn is preferably made of elastomeric material, which can be attached to the segments in a materially bonded manner by simple means.

The sealing contour can be profiled. In this embodiment, the sealing contour on the side facing away from the segment may have, for example, a corrugated structure or a grooved structure. The sealing contour improves the sealing effect of the flat gasket.

The positive-locking elements may have a connecting area and a sealing area. By separating the functions, the connection of the segments and the sealing effect in the connecting area can be improved.

The sealing contour can extend into the sealing area in each case. This ensures that the flat gasket also has a good sealing effect in the transition areas between adjacent segments.

For forming a first positive-locking element, a recess may be formed in a segment, wherein the edges bounding the recess have a sealing contour on at least one main side, and wherein second positive-locking elements may have a tongue formed from a segment and shaped congruently with the recess, which tongue is provided with a sealing contour on at least one main side. In this embodiment, the tongue provided with the sealing contour projects into the recess, which is also provided with a sealing contour at the bounding edges. As a result, the sealing contours of adjacent segments are directly adjacent to each other, with the sealing contour of the recess surrounding the sealing contour of the tongue on several sides. This results in a very good sealing effect.

The connecting area may have a dovetail connection. For this purpose, one segment has a dovetail-shaped connecting tongue, and another segment has a dovetail-shaped connecting recess. This results in a very good connection of adjacent segments.

Figure 2:
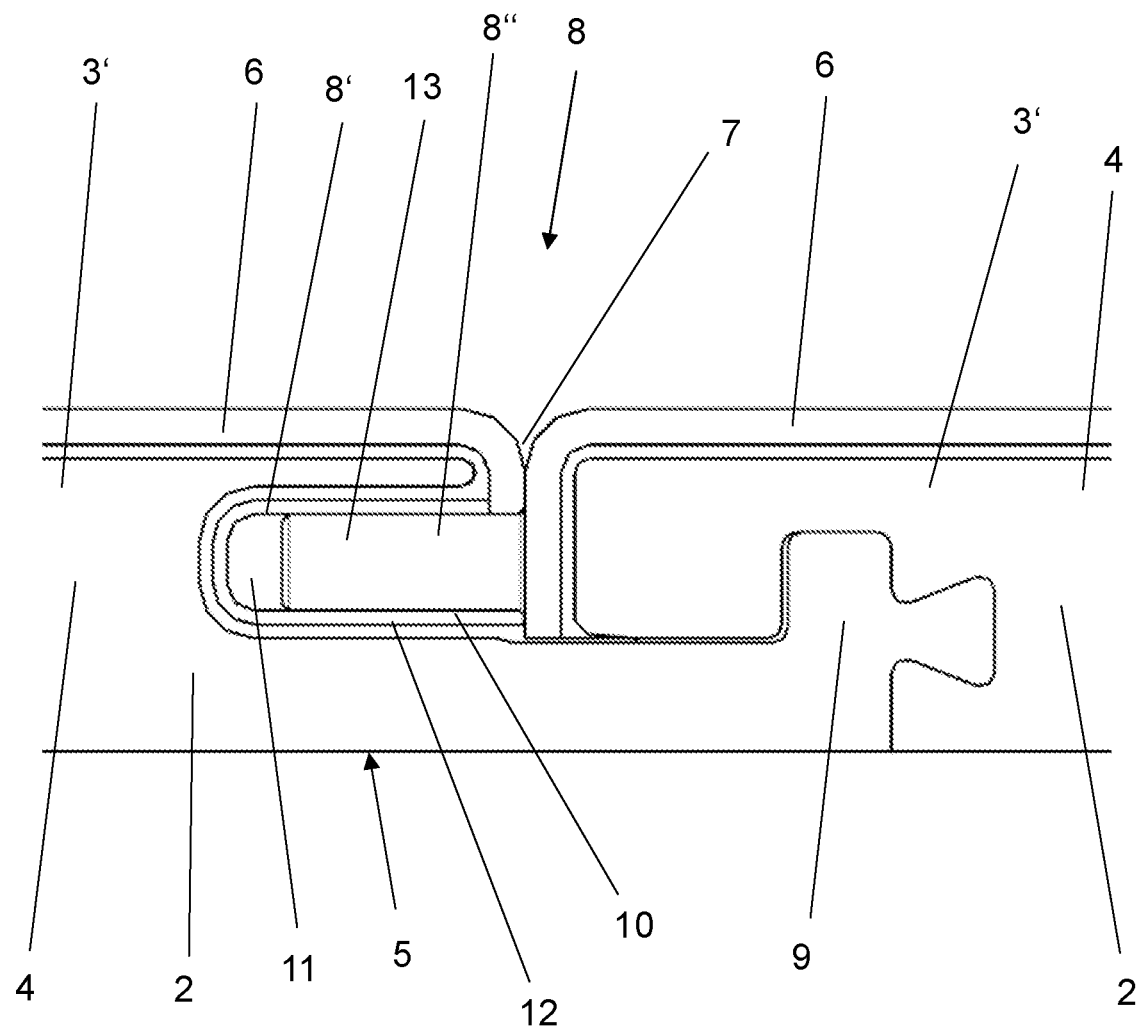

Some embodiments of the flat gasket according to the invention are explained in more detail below using the figures. These show, each schematically:

FIG. 1 a flat gasket;

FIG. 2 a detail view of the flat gasket in the area of the edges of two adjacent segments.

FIG. 1 shows a flat gasket 1 comprising a support body 2 made of tough material, in the present embodiment metal. The support body 2 has a plurality of segments 3', 3" which are positively fixed to one another. The segments 3', 3" each have two main sides 4, 5. A sealing contour 6 is arranged on a main side 4 of each segment 3', 3".

First segments 3' are rod-shaped and second segments 3" are angled and have two 90-degree angles in the present embodiment. The flat gasket 1 according to FIG. 1 comprises four first segments 3' and two second segments 3". The segments 3', 3" are positively fixed to each other and form a rectangular flat gasket 1.

The segments 3', 3" have positive-locking elements 8 at the adjacent edges 7 which are shaped congruently with one another.

The sealing contours 6 are made of elastomeric material and are materially bonded to the segments 3', 3". The sealing contour 6 is applied to the segments 3', 3" of the support body 2 by means of injection moulding. The sealing contour 6 is profiled on the side facing away from the segments 3', 3".

Circular apertures 14 are made in the segments 3', 3" at regular intervals.

FIG. 2 shows the connecting area 9 of two adjacent segments 3', 3" in detail. It can be seen that the positive-locking elements 8 have a connecting area 9 and a sealing area 10. In each case, the sealing contour 6 extends into the sealing area 10.

For forming first positive-locking elements 8', a recess 11 is formed in a segment 3', 3", wherein the edge regions 12 bounding the recess 11 have the sealing contour 6 on at least one main side 4. Second positive-locking elements 8" have a tongue 13 formed from a segment 3', 3" and shaped congruently with the recess 11, which is provided with the sealing contour 6 on a main side 4.

The connecting area 9 is spaced from the sealing area 10 and has a dovetail connection.

What is claimed is:

1. A flat gasket, comprising a support body having at least two segments, wherein the segments each have a first main side and a second main side, an interior perimeter side and an exterior perimeter side separating the first and second main sides, and a first end and a second end, wherein a first end of a first segment is configured to mechanically connect to a second end of a second segment to form a connecting area and a sealing area, and a sealing contour is arranged on at least one main side of each segment, wherein the connecting area is physically spaced from the sealing area and the sealing contour, wherein the sealing contour extends into the sealing area,
wherein a recess is made in the first segment, wherein edge regions bounding the recess have a sealing contour on at least one main side, and the second segment has a tongue shaped congruently with the recess, and wherein the tongue is provided with a sealing contour on at least one main side.

2. The flat gasket according to claim 1, wherein the first segment is rod-shaped.

3. The flat gasket according to claim 1, wherein the second segment is angled.

4. The flat gasket according to claim 1, wherein the sealing contour is made of elastomeric material and is materially bonded to the segments.

5. The flat gasket according to claim 1, wherein the sealing contour is profiled.

6. The flat gasket according to claim 1, wherein the connecting area has a dovetail connection.

7. The flat gasket according to claim 1, further comprising a connecting member extending from the first end of each segment and a recess formed at the second end of each segment, wherein a distal end of the connecting member has a multi-edged shape and the recess has a multi-edged shape that compliments the multi-edged shape of the connecting member to create a friction fit connection between the first end and the second end when the connecting member is engaged in the recess.

8. The flat gasket according to claim 1, further comprising a connecting member extending from the first end of each segment and a second recess formed at the second end of each segment, wherein a distal end of the connecting member has a multi-edged shape and the second recess has a multi-edged shape that compliments the multi-edged shape of the connecting member to create a friction fit connection between the first end and the second end when the connecting member is engaged in the second recess.

9. The flat gasket according to claim 7, further comprising a second recess located at the first end of each segment and a tongue extending from the second end of each segment, wherein the recess is configured to frictionally engage the tongue and form a second connecting area connecting one segment to a second segment.

10. The flat gasket according to claim 1, wherein the connecting area is void of adhesive.

11. The flat gasket according to claim 1, wherein the connecting area is void of an elastomeric sealing element.

12. The flat gasket according to claim 1, wherein each segment comprises a separate sealing contour.

13. A flat gasket, comprising:
a support body having at least two segments, wherein the segments each have a first main side and a second main side, an interior perimeter side and an exterior perimeter side separating the first and second main sides, and a first end and a second end, wherein a first end of a first segment is configured to mechanically connect to a second end of a second segment to form a connecting area and a sealing area, and a sealing contour is arranged on at least one main side of each segment, wherein the connecting area is physically spaced from the sealing area and the sealing contour;
a connecting member extending from the first end of each segment and a recess formed at the second end of each segment, wherein a distal end of the connecting member has a multi-edged shape and the recess has a multi-edged shape that compliments the multi-edged shape of the connecting member to create a friction fit connection between the first end and the second end when the connecting member is engaged in the recess; and
a second recess located at the first end of each segment and a tongue extending from the second end of each segment, wherein the recess is configured to frictionally engage the tongue and form a second connecting area connecting one segment to a second segment.

* * * * *